(12) United States Patent
Testi et al.

(10) Patent No.: US 9,365,006 B2
(45) Date of Patent: Jun. 14, 2016

(54) PROCESS AND PLANT FOR PRODUCING TYRES

(71) Applicants: Stefano Testi, Milan (IT); Alan Bottomley, Milan (IT); Alessio Longoni, Milan (IT)

(72) Inventors: Stefano Testi, Milan (IT); Alan Bottomley, Milan (IT); Alessio Longoni, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 65 days.

(21) Appl. No.: 14/243,606

(22) Filed: Apr. 2, 2014

(65) Prior Publication Data

US 2014/0227379 A1    Aug. 14, 2014

Related U.S. Application Data

(62) Division of application No. 13/141,633, filed as application No. PCT/IT2008/000794 on Dec. 23, 2008, now Pat. No. 8,858,852.

(51) Int. Cl.
| | | |
|---|---|---|
| *B29D 30/00* | (2006.01) | |
| *B29B 7/00* | (2006.01) | |
| *B29B 7/18* | (2006.01) | |
| *B29B 7/48* | (2006.01) | |
| *B29B 7/74* | (2006.01) | |

(Continued)

(52) U.S. Cl.
CPC .............. *B29D 30/005* (2013.01); *B29B 7/005* (2013.01); *B29B 7/007* (2013.01); *B29B 7/183* (2013.01); *B29B 7/485* (2013.01); *B29B 7/7461* (2013.01); *B29B 7/90* (2013.01); *B29C 47/1009* (2013.01); *B29C 47/1018* (2013.01); *B29C 47/366* (2013.01); *B29C 47/6025* (2013.01); *B29C 47/663* (2013.01); *B29C 47/0019* (2013.01); *B29C 47/92* (2013.01); *B29C 2947/926* (2013.01); *B29C 2947/92704* (2013.01); *B29C 2947/92866* (2013.01)

(58) Field of Classification Search
CPC ..................................................... B29D 30/005
See application file for complete search history.

(56) References Cited

U.S. PATENT DOCUMENTS

| 4,053,144 A | 10/1977 | Ellwood |
|---|---|---|
| 4,897,236 A | 1/1990 | Rábiger et al. |

(Continued)

FOREIGN PATENT DOCUMENTS

| DE | 2624048 C2 | 1/1985 |
|---|---|---|
| DE | 10050295 | 4/2002 |

(Continued)

OTHER PUBLICATIONS

"Eine Wirklich Runde Sache," KunstStoffTrends, 2003, pp. 36-37.

(Continued)

*Primary Examiner* — Larry Thrower
(74) *Attorney, Agent, or Firm* — Finnegan, Henderson, Farabow, Garrett & Dunner, L.L.P.

(57) ABSTRACT

A compound plant for processing elastomeric compounds for tires with both a high quality and a high throughput includes at least one batch mixing device in combination with at least one multi-shaft continuous mixing device having a high number of shafts. For example, the multi-shaft continuous mixing device could be a ring extruder having a plurality of co-rotating screws disposed to form a ring. In operation, a first elastomeric compound is discharged from the at least one batch mixing device and processed with the at least one multi-shaft continuous mixing device to obtain a second elastomeric compound.

22 Claims, 6 Drawing Sheets

(51) Int. Cl.
*B29B 7/90* (2006.01)
*B29C 47/36* (2006.01)
*B29C 47/60* (2006.01)
*B29C 47/66* (2006.01)
*B29C 47/10* (2006.01)
*B29C 47/00* (2006.01)
*B29C 47/92* (2006.01)

(56) References Cited

U.S. PATENT DOCUMENTS

| | | | |
|---|---|---|---|
| 5,198,171 | A | 3/1993 | Kasahara et al. |
| 5,626,420 | A | 5/1997 | Deal et al. |
| 5,758,961 | A | 6/1998 | Deal et al. |
| 5,836,682 | A | 11/1998 | Blach |
| 2002/0042479 | A1 | 4/2002 | Nanni et al. |
| 2004/0094862 | A1* | 5/2004 | Sturm et al. ............. 264/211 |
| 2006/0293457 | A1 | 12/2006 | Nadella et al. |
| 2007/0121421 | A1 | 5/2007 | Blach |
| 2008/0037359 | A1 | 2/2008 | Shintani et al. |

FOREIGN PATENT DOCUMENTS

| | | | |
|---|---|---|---|
| EP | 0 605 781 B1 | | 7/1997 |
| EP | 1757420 | * | 11/2006 |
| EP | 1 757 420 | | 2/2007 |
| SU | 887238 | | 7/1981 |
| WO | WO 03/009989 | | 2/2003 |
| WO | WO 2008/180098 | | 2/2008 |
| WO | WO 2009/062525 | | 5/2009 |

OTHER PUBLICATIONS

"VDI-K Processing Technology: Comparing Compounding Systems," Mar. 28-29, 2007 (33 pages).

Bauer, Seminar materials relating to the IKV—Institute für Kunststoffverarbeitung [Institute for Plastics Processing] Aachen 2003 Colloquium, Jun. 7, 20013 (47 pages).

Bogun, "Untersuchungen zur kontinuierlichen Herstellung von Kautschukmischungen basierend auf Rubber/Filler-Composites am Doppelschneckenextruder" ["Studies concerning the continuous production of rubber mixtures based on rubber/filler-composites on the twin screw extruder"], completed in Feb. 2005 and received in the publicly accessible library of the Faculty of Mathematics and Science at Martin Luther University in Halle/Wittenberg on Sep. 29, 2005 (137 pages).

Nijman, Continuous Mixing, a Challenging Oppotunity, KGK Kautschuk Gummi Kunststoffe, Sep. 2004, p. 430-436.

Priebe, Knotinuierliches Mischen von Kautschukmischungen, KGK Kautschuk Gummi Kunststoffer, Mar. 2005, p. 102-108.

Sauer et al., "Der RingExtruder RE," Plastics Processing Symposium—Münster/Westphalia—Kreyenborg Group, Jun. 3-5, 2003 (10 pages).

Sauer et al., Seminar materials (PowerPoint presentation) relating to the 3rd Plastics Processing Symposium of the Kreyenborg Group, Jun. 3-5, 2003 (45 pages).

Shaw, "Pirelli Could Revolutionise Mixing," European Rubber Journal, Jul. 2002, pp. 30-32.

Uphus, "Ballenware kontinuierlich zufuhren," KGK Kautschuk Gummi Kunststoffe, 2005.

Notice of Opposition issued Nov. 15, 2013 by European Patent Office against corresponding Patent No. EP 2379294 (51 pages).

English-language translation of Notice of Opposition issued Nov. 15, 2013 by European Patent Office against corresponding Patent No. EP 2379294 (50 pages).

English-language Decision on Grant of Russian Application No. 2011130905/05(045571) issued by the Patent Office of the Russian Federation on Sep. 12, 2012.

International Search Report from the European Patent Office for International Application No. PCT/IT2008/000794, mailed Sep. 25, 2009.

* cited by examiner

PROCESS AND PLANT FOR PRODUCING TYRES

CROSS REFERENCE TO RELATED APPLICATIONS

This is a divisional of application Ser. No. 13/141,633, filed Oct. 12, 2011, which is a national phase application based on PCT/IT2008/000794, filed Dec. 23, 2008, both of which are incorporated herein by reference.

FIELD OF THE INVENTION

The present invention relates to a process and a plant for producing tyres. The present invention also relates to a process and a plant for producing an elastomeric compound.

More particularly, the present invention relates to a process and plant for producing tyres in which at least one elastomeric compound used in the manufacturing of one or more tyre structural elements is produced by at least one mixing step carried out in at least one batch mixing device, and at least one mixing step carried out in a multi-shaft continuous mixing device.

BACKGROUND OF THE INVENTION

Conventionally, the production of elastomeric compounds used in the manufacturing of tyres is performed batchwise by means of batch mixing devices, e.g. internal mixers such as, for example, Banbury® mixers, having two counter-rotating rotors which exert an intensive mixing action to masticate the elastomeric polymer(s) and to incorporate and thoroughly disperse therein the other components usually present in the elastomeric compounds such as, for example, reinforcing fillers, lubricating aids, curatives and other additives.

The production of elastomeric compounds using batch mixing devices shows many drawbacks, particularly a poor heat dissipation and thus a scarce temperature control, mainly due to an unfavorable ratio between material volume and mixer surface area. To improve dispersion in the elastomeric polymer(s), the various components, and particularly the reinforcing fillers, are usually incorporated into the elastomeric polymer(s) in batches distributed in a plurality of mixing operations separated by cooling and storage steps. Usually, the temperature sensitive components, such as crosslinking agents and accelerators, are added only during the final mixing step, after the cooling of the elastomeric compounds below a predetermined temperature (usually below 110° C.) to avoid premature crosslinking ("scorching" phenomena).

Therefore, the production of elastomeric compounds using batch mixing devices, although still remaining the most widely used production process in the tyre industry, is time and energy consuming and does not guarantee an effective control on the properties of the resulting elastomeric compounds, particularly with regards to dispersion homogeneity of reinforcing fillers into the elastomeric polymer(s). Variation in the added amounts of individual components, timing of addition and discharge from the mixers, initial temperature of the raw materials, and fluctuations of shear forces inside the material during mixing, all contribute to batch-to-batch variation.

To overcome the limitations of the batchwise processes above disclosed, many attempts have been made by the rubber industry for setting up production processes based on extrusion techniques analogous to those commonly employed in the processing of thermoplastic polymer materials.

For example, U.S. Pat. No. 4,897,236 discloses a process and an apparatus for continuously producing a rubber mixture, wherein the ingredients of the mixture are fed, masticated and homogenized in a twin-screw extruder. The resulting mixture is divided into a first and a second portion. The first portion is discharged, while the second portion is recycled for further homogenization and for mixing with fresh batches of the ingredients being fed to the extruder. The recycled portion is circulated to and returned from a cooled, annular chamber exterior to the extruder chamber, said annular chamber having outflow and inflow passages communicating with the interior of the extruder.

U.S. Pat. No. 5,626,420 discloses a continuous mixing process and apparatus, wherein base elastomer(s) and other components are continuously dosed and introduced into a mixing chamber formed of a stator and a rotor rotating therein, preferably a single screw extruder. The introduced components advance within the mixing chamber along zones of propulsion and mixing. To improve dispersion and homogenization of the rubber components, the filling rate of the mixing chamber in at least certain mixing zones is lower than 1. To properly introduce the components, and particularly the rubber base, into the mixing chamber, force feeding means are used, such as volumetric pumps (e.g. gear pumps).

United States Patent Application US 2004/0094862 discloses a multi-shaft extruder with at least two shafts for compounding and/or molding an elastomer staggered with filler, in particular rubber, with at least softener and/or additives. The extruder comprises the following in succession in the direction of product transport: a feed zone, into which the elastomer and softener and/or additives are metered; a mastication/plasticization zone with at least one kneading element, into which the elastomer with the softener and/or additives is transferred to a flowable, cohesive mixture; a dispersing zone with at least one additional kneading element, in which the filler in the elastomer is comminuted and distributed; and the kneading elements having a comb and the extruder having a casing inner wall, and wherein a gap with a gap width Z of about 1/100 to about 1/10 of the kneading element diameter D is present between the comb of the kneading elements and the casing inner wall of the extruder. In one embodiment, the multi-shaft extruder is a ring extruder.

PCT Patent Application no. WO 03/009989 discloses a process and an apparatus for the continuous production of elastomeric compositions by means of at least one extruder, wherein the minor ingredients are used in the form of subdivided products. The products include at least one of the minor ingredients dispersed in a thermoplastic binding agent and are conveyed to a dosing device by means of a pneumatic conveying line, to be accurately metered and continuously fed into the extruder.

SUMMARY OF THE INVENTION

The Applicant has noted that the quality of the elastomeric compounds for tyres prepared by using batch mixing devices may be unsatisfactory: in particular, variations in the mechanical properties between different batches may be obtained, and dispersion of the reinforcing fillers may be, in some cases, poor.

Typically, in order to improve dispersion of the reinforcing fillers, the number of mixing steps is increased. However, increasing the number of mixing steps in batch mixing device may cause a lot of drawbacks such as, for example, damages to the elastomeric polymer(s), worsening of the mechanical properties of the elastomeric compounds, premature crosslinking ("scorching" phenomena) of the elastomeric compounds.

On the other hand, use of continuous mixing devices in place of batch mixing devices has proven that high quality elastomeric compounds can be obtained. However, one of the most critical aspects in the production of elastomeric compounds by means of continuous mixing devices, e.g. twin screw extruders, is the feeding system of all the components of the elastomeric compounds into the continuous mixing devices. In fact, said components must be worked (e.g. granulated, pelletized, subdivided, etc.) and precisely dosed to be fed into the continuous mixing devices. For these reasons, a complex feeding system should be provided, which causes an increase in the overall production processing time and in the space required to the related facilities: this leads to a sharp increase of the overall production costs.

The Applicant has found that a high quality elastomeric compound can be obtained in a compounding plant of reduced complexity by producing the elastomeric compound with at least one mixing step carried out in at least one batch mixing device and at least one mixing step carried out in at least one continuous mixing device.

In particular, it has been found that the obtained elastomeric compound shows a significantly improved dispersion of the reinforcing filler(s), together with improved mechanical properties (both static and dynamic). A significant repeatability of the results obtained in terms of mechanical properties of the obtained elastomeric compounds has also been verified.

However, another problem arose: batch mixing devices and continuous mixing devices are very different machines in terms of maximum throughput. While a batch mixing device is able to produce (with a number of batches) elastomeric compounds at a throughput of not less than 1000-2000 kg/hour, and preferably more, common continuous mixers such as twin screw extruders can hardly reach such throughputs for the production of elastomeric compounds. Differently from thermoplastic compounds, elastomeric compounds do not have a melting point, are thermally sensitive and prone to degradation, due to scorching phenomena and/or the occurrence of thermal reactions, when high screw rotation speed, and/or high shear rate, and/or high energy is used in order to improve the throughput. This is due to the heat developed by the kneading action in the limited space between the screws and the walls of the screw channels, as well as to the developed pressures at the twin screw die exit, particularly in case a fixed die head is used. These drawbacks substantially occur even for elastomeric compounds having a moderate viscosity (e.g. from at least 50-60 Mooney viscosity ML(1+4) at 100° C.), i.e. they apply to substantially all the elastomeric compounds commonly used in the field of tyres.

This strongly limits the throughput reachable by common continuous mixers in the production of elastomeric compounds. For example, it has been found that a twin screw extruder having a screw diameter of 40 mm can reach typical throughputs of less than 40-50 kg/hour for viscous elastomeric compounds, i.e. at least 50 times less than typical throughputs obtainable by batch mixing devices. The increasing of the size of a twin screw extruder does not lead to significant improvements in terms of obtained throughput: for example, it has been found that increasing the screw diameter of a twin screw extruder to about 90 mm leads to a throughput around 200-250 kg/hour for viscous elastomeric compounds, i.e. at least 5-10 times less than typical throughputs obtainable by batch mixing devices. In this respect, it has also to be taken into account that an increase in screw diameter is always accompanied by a related increase in the length of the twin screw extruder, as well as in the increase in complexity and cost of the machine, particularly due to the power required to the engines used for rotating the screws in a massive machine.

The Applicant has thus understood that in order to provide a compounding plant adapted for processing viscous elastomeric compounds with both a high quality and a high throughput, so as to be compliant with the request of a typical tyre production plant, at least one batch mixing device in combination with at least one multi-shaft continuous mixing device having a high number of shafts (e.g. a ring extruder having twelve co-rotating screw disposed substantially to form a ring) should be provided.

It has been found that the high number of shafts allows increasing the throughput of the continuous mixing device to a value comparable with that of a batch mixing device without the need of increasing the screw rotation speed, and/or the shear rate, and/or the screw diameter to values which could lead to scorching of the compound. Furthermore, a superior quality of a compound prepared at the batch mixing device and subsequently processed at the multi-shaft continuous mixing device has been verified. Moreover, the desired throughputs can be obtained even with machines having low screw diameter, so that the length of the multi-shaft continuous mixing device can be also kept sufficiently low, thanks to the processing performed by the high number of parallel mixing screws. In addition to the reduced length of the multi-shaft continuous mixing device, a compounding plant comprising at least one batch mixing device and at least one multi-shaft continuous mixing device does not need complex feeding systems for the feeding of the continuous mixing device, so that the overall size of the compounding plant can be advantageously contained. This is a great advantage when the compounding plant is part of a full tyre production plant, where many devices and areas are provided further to the devices related to compounding, such as devices adapted for preparing semifinished products, green tyre manufacturing machines, vulcanization presses, tyre quality control areas, etc.

For the purposes of the present description and of the claims which follow, the term "batch mixing device" means a mixing device into which the components of the elastomeric compound are periodically fed in predefined amounts (batches) and mixed for a predetermined time so as to obtain the elastomeric compound. At the end of the mixing step, the obtained elastomeric compound is completely discharged from the mixing device.

For the purposes of the present description and of the claims which follow, the term "continuous mixing device" means a mixing device into which the material to be processed to obtain an elastomeric compound is continuously fed (apart from possible stopping of the mixing device due to maintenance, or change of elastomeric compound recipe) and from which the elastomeric compound is discharged in a continuous stream, in contrast to the periodic charge/discharge of a batch mixing device.

According to a first aspect the present invention relates to a process for manufacturing a tyre, comprising:
  providing at least one crosslinkable elastomeric compound;
  manufacturing a plurality of structural elements of said tyre, wherein at least one structural element of said plurality of structural elements comprises said at least one crosslinkable elastomeric compound;

manufacturing a green tyre using said plurality of structural elements;

subjecting the green tire to moulding and crosslinking to obtain a finished tyre;

wherein the providing of said at least one crosslinkable elastomeric compound comprises:

feeding at least one elastomeric polymer and at least one reinforcing filler to a mixing apparatus including at least one batch mixing device;

mixing and dispersing, in said mixing apparatus, said at least one reinforcing filler into said at least one elastomeric polymer, so as to obtain a first elastomeric compound;

discharging said first elastomeric compound from said mixing apparatus;

feeding said first elastomeric compound to at least one multi-shaft continuous mixing device, said multi-shaft continuous mixing device comprising at least six rotating screws;

mixing said first elastomeric compound into said at least one multi-shaft continuous mixing device, so as to obtain a second elastomeric compound.

According to a further aspect the present invention relates to a plant for manufacturing tyres, comprising:

a compounding plant being adapted to produce at least one crosslinkable elastomeric compound;

at least one manufacturing machine adapted for preparing a green tyre using a plurality of structural elements;

at least one device adapted for preparing at least one structural element of said plurality of structural elements, wherein said at least one structural element comprises said at least one crosslinkable elastomeric compound;

at least one vulcanization press adapted to moulding and crosslinking said green tyre to obtain a finished tyre;

wherein the compounding plant comprises:

a mixing apparatus including at least one batch mixing device, said mixing apparatus being adapted to produce a first elastomeric compound;

at least one multi-shaft continuous mixing device, said multi-shaft continuous mixing device comprising at least six rotating screws, said multi-shaft continuous mixing device being adapted to receive said first elastomeric compound and to produce a second elastomeric compound.

According to a further aspect the present invention relates to a process for producing an elastomeric compound, comprising:

feeding at least one elastomeric polymer and at least one reinforcing filler to a mixing apparatus including at least one batch mixing device;

mixing and dispersing, in said mixing apparatus, said at least one reinforcing filler into said at least one elastomeric polymer, so as to obtain a first elastomeric compound;

discharging said first elastomeric compound from said mixing apparatus;

feeding said first elastomeric compound to at least one multi-shaft continuous mixing device, said multi-shaft continuous mixing device comprising at least six rotating screws;

mixing said first elastomeric compound into said at least one multi-shaft continuous mixing device, so as to obtain a second elastomeric compound.

According to a further aspect, the present invention relates to a plant for producing an elastomeric compound, comprising:

at least one mixing apparatus including at least one batch mixing device, said mixing apparatus being adapted to produce a first elastomeric compound;

at least one multi-shaft continuous mixing device, said multi-shaft continuous mixing device comprising at least six rotating screws, said multi-shaft continuous mixing device being adapted to receive said first elastomeric compound and to produce a second elastomeric compound.

The Applicant has found that the second elastomeric compound discharged from the multi-shaft continuous mixing device shows a significantly improved dispersion of said at least one reinforcing filler with respect to said first elastomeric compound, together with equivalent or even superior mechanical properties (both static and dynamic).

The present invention, in at least one of the abovementioned aspects, may show one or more of the preferred characteristics hereinafter disclosed.

According to one preferred embodiment, said process for producing the elastomeric compound may be carried out continuously or discontinuously.

When said process is carried out continuously, the first elastomeric compound is directly fed to said at least one multi-shaft continuous mixing device without being stored.

When said process is carried out discontinuously, said first elastomeric compound is fed to said at least one multi-shaft continuous mixing device after having being stored.

According to one preferred embodiment, said batch mixing device is selected from internal mixers, open mixers. Internal mixers are particularly preferred.

Usually, said batch mixing device comprises a pair of rotors which operate tangentially relative to each other or are inter-penetrating.

Usually, said batch mixing device comprises a mixing chamber internally housing a pair of rotors turning in opposite directions, so as to mix up the components introduced into the mixing chamber from the top thereof.

For this purpose, said batch mixing device is usually provided with a pneumatic or hydraulic cylinder located in the upper part of the mixing chamber and a piston movable upwards to open the mixing chamber, thereby allowing the introduction of the components via special loading hoppers, and downwards so as to exert a pressure on the material processed by the rotors and located above them.

A hydraulic system located on the bottom of the mixing chamber allows discharging of the elastomeric compound at the end of the mixing cycle by opening a suitable outlet.

Specific examples of internal mixers which may be advantageously used according to the present invention are those known under the tradename of Banbury® or Intermix®, depending on whether the rotors operate tangentially relative to each other or are inter-penetrating. Banbury® mixer is particularly preferred.

Specific examples of open mixers which may be advantageously used according to the present invention are: open mill mixer, Z-blade mixer. Open mill mixer is particularly preferred.

According to one preferred embodiment, the mixing in said at least one batch mixing device may be carried out at a rotor speed of about 20 rpm to about 60 rpm, preferably of about 30 rpm to about 50 rpm.

According to a further preferred embodiment, the mixing in said at least one batch mixing device, may be carried out using a fill factor of the mixing chamber (the fill factor is the portion of the total free volume of the mixing chamber occupied by the material to be mixed) not higher than about 80%, preferably of about 55% to about 70%. If a too high fill factor is selected, lack of free volume prevents material movement and cross-blending, so that adequate mixing becomes problematic. Likewise, if only a very small fill factor is selected, it is difficult to ensure adequate mixing, with high shearing forces, and adequate homogenisation of the material in the mixing chamber.

According to one preferred embodiment, said at least one multi-shaft continuous mixing device comprises at least six co-rotating screws. The screws are preferably disposed so as to form a ring. More preferably said at least one multi-shaft continuous mixing device comprises at least twelve rotating screws, even more preferably co-rotating screws.

Said rotating screws may comprise high-shear mixing elements such as kneaders or screw flights with low flight depth. The screw shafts are preferably parallel.

Preferably, the screws are at least partially intermeshed. More preferably, the screws are substantially fully intermeshed. Even more preferably, the screws are self-wipening.

Preferred screw diameters range from at least 30 mm, more preferably from at least 60 mm.

Preferably, said multi-shaft continuous mixing extruder is a ring extruder comprising:
  an inner core (or mandrel);
  an outer housing defining with said inner core an annular chamber;
  at least six screws, more preferably at least twelve screws, rotatably mounted within said annular chamber.

In preferred embodiments, the ring extruder comprises gas outlet openings provided in the outer housing, to allow removal of volatile material. Vacuum can be advantageously applied to said gas outlet openings, to further facilitate extraction of volatile material.

Tests performed on ring extruders as disclosed above (particularly when vacuum was applied to gas outlet openings provided within the outer housing) have advantageously showed a substantial null tendency to blister formation of the elastomeric compound discharged at the output of the ring extruder. According to the Applicant, this is due to the increased degassing capacity offered by the ring extruder, which is capable to effectively remove (through the gas outlet openings) air or other volatiles entrapped in the elastomeric compound being mixed, due to the increased exchange surface offered by the inner core and the outer housing.

According to one preferred embodiment, the mixing in said at least one multi-shaft continuous mixing device may be carried out at a screw rotation speed of about 10 rpm to about 600 rpm, preferably of about 40 rpm to about 400 rpm.

It has to be noted that said screw rotation speed allows to obtain a very good dispersion of the ingredients, in particular of the reinforcing fillers, in the second elastomeric compound, as well as to avoid premature crosslinking ("scorching" phenomena) of the second elastomeric compound which may occur if a too high screw rotation speed is used.

Advantageously, the second elastomeric compound can be discharged from said multi-shaft continuous mixing device at an average throughput of at least 500 kg/h, preferably of at least 800 kg/h. In such way, a compounding plant comprising a mixing apparatus including at least one batch mixing device in combination with one or two multi-shaft continuous mixing devices may reach an overall throughput compatible with a tyre production at industrial scale.

In preferred embodiments, the first elastomeric compound is cooled before feeding it to said at least one multi-shaft continuous mixing device. Preferably, said first elastomeric compound may be cooled to a temperature from about 15° C. to about 40° C., more preferably from about 20° C. to about 25° C.

At least one conveying extruder may be included in the compounding plant.

According to a preferred embodiment, the first elastomeric compound is fed to said at least one conveying extruder before being fed to said at least one multi-shaft continuous mixing device.

According to a preferred embodiment, said at least one conveying extruder comprises:
  a housing, said housing including at least one feed opening and a discharge opening;
  at least one conveying element rotatably mounted in said housing.

For the purposes of the present invention, the term "conveying element" means an element which does not substantially exert a mixing action but merely exerts a conveying of the elastomeric compound through the extruder length. Typical conveying elements may be selected, for example, from elements that mainly promote axial movement of the material such as helical screws.

The conveying in said at least one conveying extruder may be exemplarily carried out at a conveying element speed from about 10 rpm to about 60 rpm, preferably from about 20 rpm to about 35 rpm.

The feeding to said at least one conveying extruder may allow to control the feeding rate of the first elastomeric compound to the multi-shaft continuous mixing device.

Said at least one conveying extruder may be a single helical screw extruders, or a dump extruder having two counter-rotating helical screws.

According to a further embodiment, said mixing apparatus includes at least one internal mixer and at least one open mixer, said open mixer being preferably placed downstream of said at least one internal mixer.

According to a further embodiment, the second elastomeric compound discharged from the at least one multi-shaft continuous mixing device can be fed to at least one further batch mixing device. Said at least one further batch mixing device may be selected from those above disclosed.

According to a further embodiment, said at least one multi-shaft continuous mixing device may be placed upstream of a device for preparing at least one structural element of a green tyre by using said second elastomeric compound discharged by the multi-shaft continuous mixing device, or by using a further compound obtained by a further mixing step performed on the second elastomeric compound.

The device for preparing, the green tyre structural element may be selected from those commonly known in the art such as, for example, calendering devices and/or extruder devices.

According to further embodiments, said at least one multi-shaft continuous mixing device may be directly equipped with a roller die or with an extrusion die. Especially in the latter case, a green tyre structural element can be directly obtained at the output of said at least one multi-shaft continuous mixing device.

Said green tyre structural element may be, for example, one of the different elastomeric structural elements of a tyre such as, for example: bead filler, sidewall, tread band, liner, underliner, antiabrasive layer. According to processes known in the art, said structural elements are subsequently assembled using a suitable manufacturing apparatus to give a finished tire.

Another structural element obtainable by using said second elastomeric compound discharged by the multi-shaft continuous mixing device, or by using a further compound obtained by a further mixing step performed on the second elastomeric compound is a continuous elongated strip-like element. During formation of a green tyre, the continuous strip-like element can be laid down on a support (e.g. a forming drum) in a plurality of windings, so as to form a plurality of consecutive coils disposed in side by side and/or superposed relationship with each other. In such manner, equivalents of many structural elements of a tyre, typically obtained by semi-finished products, can be formed by the spiral windings. For example, equivalents of a bead filler, a sidewall, a tread band, a liner, an underliner, an antiabrasive layer can be obtained by spiral winding of a continuous strip-like element.

Said continuous strip-like element may have a flattened cross-sectional shape such as, for example, rectangular, elliptic, lenticular, or tapered shape. Cross-section dimensions of said continuous strip-like element may be considerably lower than the cross-section dimensions of the equivalent structural element to be obtained by spiral winding.

Said continuous strip-like element can be obtained directly at the output of the multi-shaft continuous mixing device, through a suitable extrusion die.

According to one preferred embodiment, all the ingredients of the crosslinkable elastomeric compound are fed to said at least one mixing apparatus.

In particular, besides said at least one elastomeric polymer and said at least one reinforcing filler, at least one of the following components may be added to the elastomeric compound:

vulcanizing agents such as, for example, sulfur, or molecules containing sulfur (sulfur donors), or mixtures thereof;

activators such as, for example, zinc compounds, and in particular ZnO, $ZnCO_3$, zinc salts of saturated or unsaturated fatty acids containing from 8 to 18 carbon atoms, such as, for example, zinc stearate, which are preferably formed in situ in the elastomeric compound from ZnO and fatty acid, and also BiO, PbO, $Pb_3O_4$, $PbO_2$, or mixtures thereof;

accelerators such as, for example, dithiocarbamates, guanidine, thiourea, thiazoles, sulphenamides, thiurams, amines, xanthates, or mixtures thereof;

additives selected on the basis of the specific application for which the composition is intended such as, for example, antioxidants, anti-ageing agents, plasticizers (e.g. plasticizing oils), adhesives, anti-ozone agents, modifying resins, or mixtures thereof.

The above list of components is given only to illustrate some examples of the most common components usually used in elastomeric compounds, particularly in elastomeric compound for tyre manufacturing, and shall not be intended as limiting of the scope of the present invention.

When all the components of the elastomeric compound are fed to a batch mixing device, e.g. an internal mixer such as a Banbury® mixer, the mixing may be preferably carried out in at least two different steps, the first step being a non-productive step wherein all the components except those able to promote the crosslinking (for example, sulfur and accelerators) are fed to said batch mixing device, the second step being a productive step wherein the elastomeric compound obtained from said first step as well as the components able to promote crosslinking are fed to said batch mixing device. The so obtained elastomeric compound (i.e. the above mentioned first elastomeric compound), is then subsequently fed to a multi-shaft continuous mixing device so as to obtain a second elastomeric compound.

Alternatively, all the components of the elastomeric compound, except from the components able to promote crosslinking, are fed to a batch mixing device, e.g. an internal mixer such as a Banbury® mixer, to obtain a first elastomeric compound which is subsequently fed to a multi-shaft continuous mixing device, so as to obtain a second elastomeric compound. The so obtained second elastomeric compound, as well as the components able to promote crosslinking, are subsequently fed to a further batch mixing device, e.g. an internal mixer such as a Banbury® mixer, which is placed downstream of said multi-shaft continuous mixing device.

Alternatively, all the components of the elastomeric compound, except from the components able to promote crosslinking, are fed to a batch mixing device, e.g. an internal mixer such as a Banbury® mixer, to obtain a first elastomeric compound. The so obtained first elastomeric compound, as well as the components able to promote crosslinking, are subsequently fed to a multi-shaft continuous mixing device, so as to obtain a second elastomeric compound.

When an open mixer is used as a batch mixing device, preferably, all the components of the elastomeric compound are fed to said open mixer so as to obtain a first elastomeric compound which is subsequently fed to a multi-shaft continuous mixing device, so as to obtain a second elastomeric compound.

The compounding process and plant according to aspects of the present invention may be employed to produce an elastomeric compound comprising any kind of elastomeric polymers, as well as any kind of reinforcing fillers, usually used in the tyre manufacturing.

Preferably, the elastomeric polymers may be selected, for example, from diene elastomeric polymers and mono-olefin elastomeric polymers, or mixtures thereof.

Diene elastomeric polymers may be selected, for example, from elastomeric polymers or copolymers with an unsaturated chain having a glass transition temperature ($T_g$) generally below 20° C., preferably in the range from about 0° C. to about −110° C. These polymers or copolymers may be of natural origin or may be obtained by solution polymerization, emulsion polymerization or gas-phase polymerization of one or more conjugated diolefins, optionally blended with at least one comonomer selected from monovinylarenes and/or polar comonomers. Preferably, the obtained polymers or copolymers contain said at least one comonomer selected from monovinylarenes and/or polar comonomers in an amount of not more than 60% by weight. Examples of diene elastomeric polymers are: cis-1,4-polyisoprene (either natural or synthetic, preferably natural rubber), 3,4-polyisoprene, poly-1,3-butadiene (in particular, high vinyl poly-1,3-butadiene having a content of 1,2-polymerized units from about 15% to about 85% by weight), polychloroprene, optionally halogenated isoprene/isobutene copolymers, 1,3-butadiene/acrylonitrile copolymers, 1,3-butadiene/styrene copolymers, 1,3-butadiene/isoprene copolymers, isoprene/styrene copolymers, isoprene/1,3-butadiene/styrene terpolymers; or mixtures thereof.

As to mono-olefin elastomeric polymers, they may be selected, for example, from: copolymers of ethylene with at least one alpha-olefin having from 3 to 12 carbon atoms, and optionally with a diene having from 4 to 12 carbon atoms; polyisobutene; copolymers of isobutene with at least one diene. Particularly preferred are: ethylene/propylene copolymers (EPR); ethylene/propylene/diene terpolymers (EPDM); polyisobutene; butyl rubbers; halobutyl rubbers; or mixtures thereof.

Preferably, said at least one reinforcing filler may be selected, for example, from: carbon black, silica, alumina, aluminosilicates, calcium carbonate, kaolin, or mixtures thereof.

When a reinforcing filler comprising silica is present, the elastomeric compound may advantageously incorporate a coupling agent capable of interacting with silica and of linking it to the elastomeric polymer(s) during the vulcanization. Among the coupling agents that are particularly preferred are bis(3-triethoxysilylpropyl)-tetrasulphide, or bis(3-triethoxysilylpropyl)disulphide. Said coupling agents may be used as such or as a suitable mixture with an inert filler (for example, carbon black) so as to facilitate their incorporation into the elastomeric compound.

BRIEF DESCRIPTION OF THE DRAWINGS

The present invention will now be illustrated in further detail by means of illustrative embodiments, with reference to the attached figures wherein.

DETAILED DESCRIPTION OF PREFERRED EMBODIMENTS

As mentioned in the foregoing, the Applicant has found that a high quality elastomeric compound can be obtained in a compounding plant of reduced complexity by producing the elastomeric compound with at least one mixing step carried out in at least one batch mixing device and at least one mixing step carried out in at least one continuous mixing device.

In particular, it has been found that the thus obtained elastomeric compounds show a significantly improved dispersion of the reinforcing filler(s), together with improved mechanical properties (both static and dynamic). A significant repeatability of the results obtained in terms of mechanical properties of the obtained elastomeric compounds has also been verified. An example of these remarkable results is reported in the remainder of the description of the present application, for an elastomeric compound processed in a batch mixing device and then re-milled using a ring extruder. Further examples obtained by processing various elastomeric compounds using a batch mixing device and a twin screw extruder can be found in a previous patent application filed by the same Applicant on Nov. 13, 2007, whose application number is WO2007EP009798.

Figure 1:
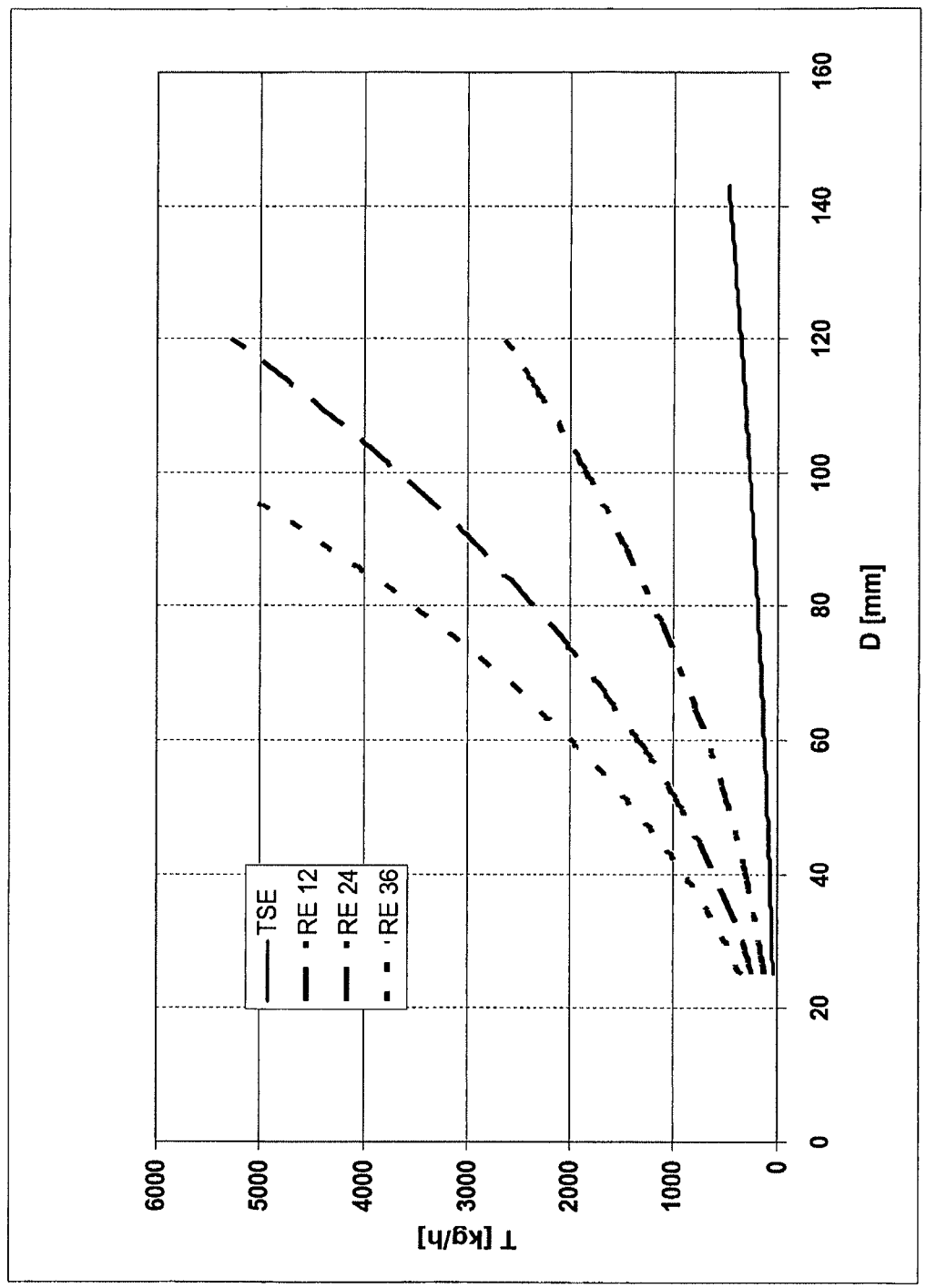
FIG. 1 is a graph showing a throughput T (measured in kg/h) versus the screw diameter D (measured in mm) obtainable for a typical viscous elastomeric compound at the output of different types of multi-shaft continuous mixing devices.

With reference to FIG. 1, a graph showing the throughput T (measured in kg/h) obtainable for a typical viscous elastomeric compound at the output of various types of multi-shaft continuous mixing devices when processing elastomeric materials, versus the diameter of the screws used in such multi-shaft continuous mixing devices.

In particular, the graph of FIG. 1 shows the throughput versus the screw diameter of a twin screw extruder (TSE, solid line), of a ring extruder having twelve screws disposed along a ring (RE 12, dash-dot line), of a ring extruder having twenty-four screws disposed along a ring (RE 24, dashed line), of a ring extruder having thirty-six screws disposed along a ring (RE 36, dotted line).

The graph was obtained by the Applicant in part by fitting experimental data, and in part by simulation. In particular, the trend related to the TSE is a fit of experimental throughput data obtained by the Applicant using different twin screw extruders (i.e. multi-shaft continuous mixing devices having two co-rotating parallel screws) for processing a rubber compound comprising carbon black as reinforcing filler, i.e. a typical mixture for use in the tyre industry. The following general fitting formula was written for fitting the TSE data trend, which could be written as:

$$T = T_0 \left( \frac{D}{D_0} \right)^\alpha$$

wherein $D_0$, $T_0$ and $\alpha$ are fit parameters. In particular, $T_0$ corresponds to the throughput obtainable at a screw diameter $D_0$. For the tested rubber compound with the TSEs, the experimental data were fitted by using a parameter $\alpha$ of about 2. Such value could be even lower for other elastomeric compounds.

On the other hand, the trends for the different ring extruders are the result of a simulation performed by the Applicant. In particular, a throughput $T_0$ obtainable at a certain screw diameter $D_0$ for each of the ring extruders RE 12, RE 24 and RE 36 was calculated by simulation, and then the above fitting formula (with $\alpha=2$) was applied to plot the curves shown in the graph of FIG. 1.

As visible in FIG. 1, the growth of the throughput reachable by twin screw extruders versus screw diameter is very low. Less than 500 kg/h can be obtained with a screw diameter of 133 mm, which appears to be close to an upper limit for such kind of continuous mixing device: in fact, high screw diameter values correspond to a respective high hugeness for the overall mixing device, so that twin screw extruders having a higher screw diameter are feasible at a very high cost and require large space in the compounding plant.

The low growth of the throughput trend for a twin screw continuous mixing device in the processing of elastomeric materials principally depends on the fact that the elastomeric material must be "gently" worked (i.e. at relatively low screw rotation speed, and/or at relatively low shear rate, and/or at relatively low energy, etc.), in order to keep a low temperature of the compound being mixed within the screw channels, to prevent premature scorching of the compound.

Since typical batch mixing devices used in compounding plants of industrial tyre production sites have minimum throughputs of about 1000 kg/h (or much more, for massive compound production), the throughput result shown in FIG. 1 for the twin screw extruder (solid line) highlights that the coupling of a batch mixing device and of a twin screw extruder may become problematic. In order to keep the production of the two types of machines phased, either the batch mixing device should work at a lower throughput, or a high number of huge twin screw extruders should be used for each batch mixing device. In the former case, an unacceptable productivity of the overall compounding plant could be obtained (unless "niche" compound production is envisaged). In the latter case, a disadvantageous increase of the overall size of the compounding plant could be obtained, to a limit for which such solution could not be used for compounding plants already in place and sized.

Additionally, further drawbacks could be found in preferred embodiments in which the working of the overall compounding plant comprising at least one batch mixing device and at least one continuous mixing device is carried out continuously, i.e. by using devices (e.g. conveying extruders, and/or belt transportation devices) for transporting directly the compound discharged by the batch mixing device(s) to the continuous mixing device(s), without a storing of the same compound after the discharge from the batch mixing device(s). A high number of continuous mixing devices to be coupled to each batch mixing device could seriously complicate the layout of the overall compounding plant, to an extent that such theoretically advantageous and effective solution could become practically unfeasible. In such case, only a discontinuous working of the compounding plant can be carried out, with the additional disadvantage of the loss of space caused by the creation of possibly large areas dedicated to the stocking the compound discharged from the batch mixing device(s) and waiting to be processed by the continuous mixing devices, with additional issues relating to the control of the environmental conditions in such areas in order to prevent impairment of the quality of the stored compound.

The graph of FIG. 1 thus practically shows that in order to produce elastomeric compounds with both a high quality and a high throughput, compatible with a tyre production on industrial scale, a compounding plant comprising at least one batch mixing device and continuous mixing devices having only two shafts does not represent an advantageous (and in some cases a feasible) solution.

A different result is inferred when considering, in FIG. 1, the throughput trends of ring extruders. As it can be seen, a throughput of at least 500 kg/h for a typical elastomeric compound to be used for manufacturing tyres can be obtained by a ring extruder having twelve screws of about 50-60 mm in diameter (see dash-dot line), i.e. by a quite compact machine which does not need long screw channel lengths. Even better results in terms of obtainable throughputs are shown by the graph of FIG. 1 for ring extruders having a higher number of screws (see dashed and dotted lines, relating to twenty-four and thirty-six screws, respectively), for which a throughput of 500 kg/h could be obtained with screws having diameter of about 30-40 mm. By considering the trends shown in FIG. 1 as a whole, it can be inferred that a ring extruder comprising six screws (for which the throughput trend is not explicitly shown in FIG. 1, but that is located somewhere in the middle between the solid line related to the twin screw extruder and to the ring extruder having twelve screws) could be able to obtain a throughput of about 500 kg/h by using a screw diameter of about 80 mm, still in an acceptable range of feasibility, compactness and cost of the machine.

It is thus shown that a compounding plant using batch mixing devices in combination with multi-shafts continuous mixing devices having at least six rotating screws (possibly used in pairs for each batch mixing device) can phase and balance its production of high quality elastomeric compound for tyres on high throughputs, compatible with a tyre production on industrial scale.

Among such multi-shafts continuous mixing devices, preferred embodiments are represented by ring extruders, which are able to give additional advantages in terms of machine compactness (particularly in length, under the same diameter), and degassing capability.

Figure 2:
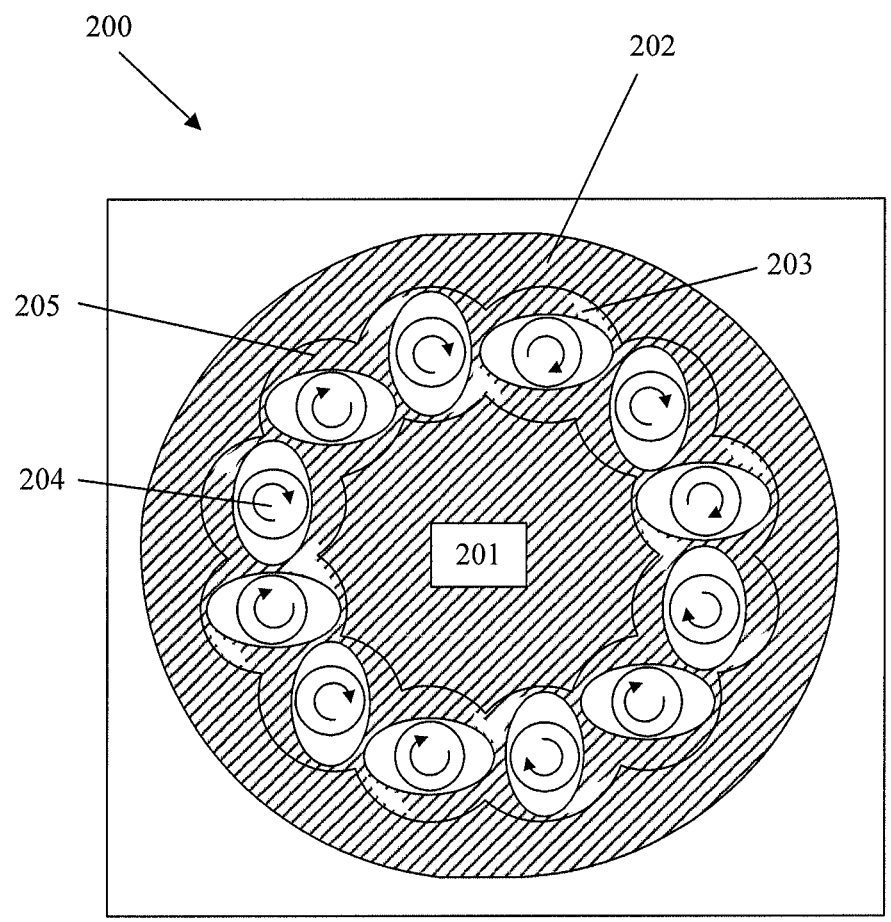
FIG. 2 schematically shows a transverse section of a ring extruder usable in a compounding plant according to an embodiment of the present invention.

With reference to the schematic sectional view shown in FIG. 2, typically, a ring extruder (200) comprises:
- an inner core, or mandrel (201);
- an outer housing (202) defining with said inner core an annular chamber (203);
- a plurality of screws (204) rotatably mounted on respective shafts within said annular chamber (203), to form a ring.

As shown in FIG. 2, the plurality of screws are co-rotating and at least partially (preferably fully) intermeshed. In operation, the screws (204) intensely mix the elastomeric compound (205) within the annular chamber (203), and the elastomeric compound moves from one screw channel to the other in a high number of intermeshing regions. so as to increase the heat exchange with the housing surface. In preferred embodiments, self-wipening screws are used in the ring extruders.

Advantageously, a ring extruder also typically comprises gas outlet openings (not shown in FIG. 2) provided in the outer housing, to allow removal of volatile material. Vacuum can be advantageously applied to said gas outlet openings, to further facilitate extraction of volatile material.

Exemplary embodiments of ring extruders which can be applied for the purposes of the present invention are sold by Extricom GmbH. U.S. Pat. No. 5,836,682 and US patent application 2007/0121421, herein incorporated by reference in their entirety, are exemplary documents related to ring extruders.

In the following, a number of embodiments for a compounding plant comprising at least one batch mixing device and at least one multi-shaft continuous mixing device will be described. For simplicity of description, a ring extruder will be used as exemplary continuous mixing device having a high number of shafts.

Figure 3:
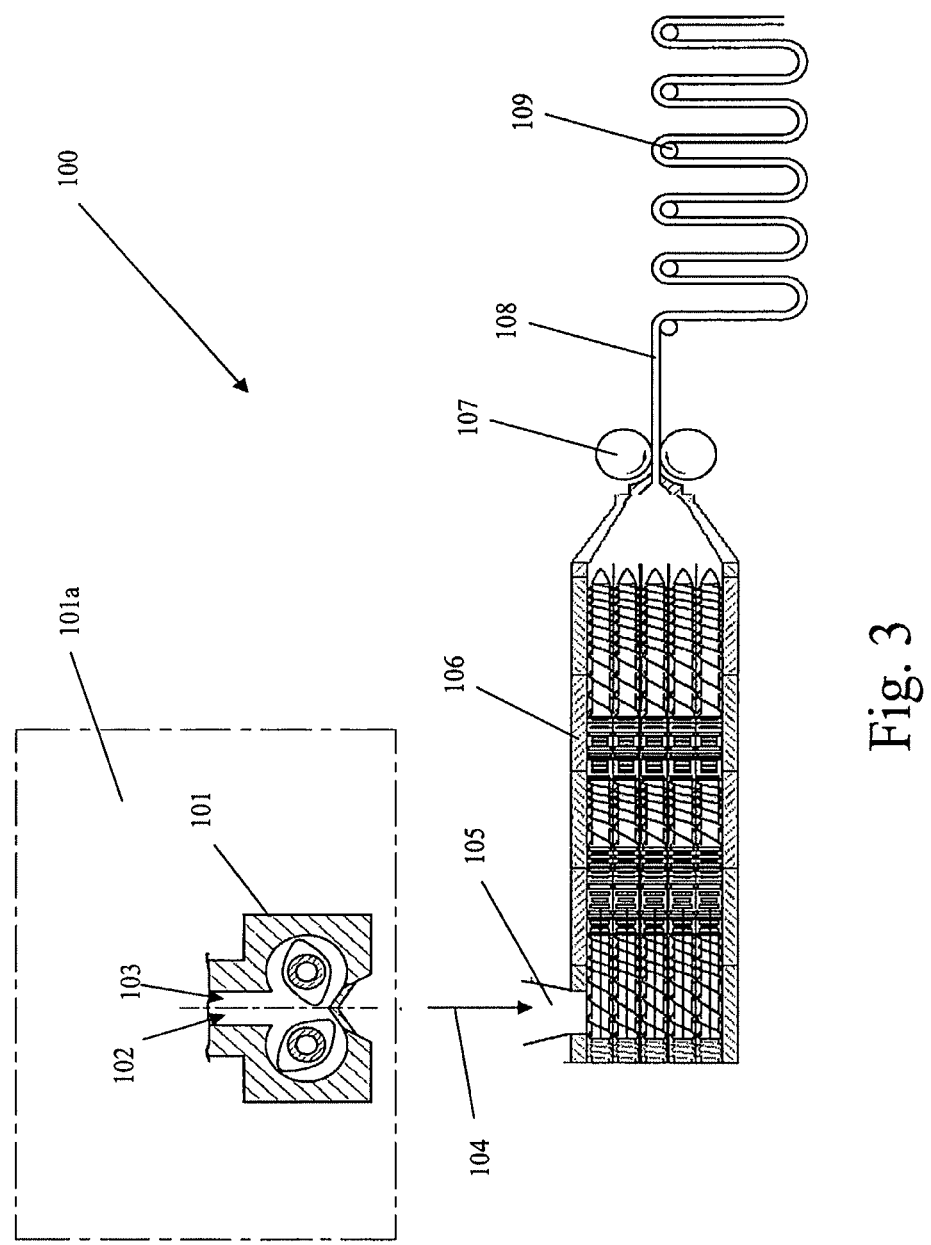
FIGS. 3-6 show schematic diagrams of plants for producing an elastomeric compound according to exemplary embodiments of the present invention.

With reference to FIG. 3, a compounding plant (100) for producing an elastomeric compound according to the present invention includes a mixing apparatus (101a) comprising an internal mixer (101) (e.g. a Banbury® mixer) wherein the elastomeric polymer(s) (102) and the reinforcing filler(s) (103) are fed.

Preferably, all the remaining components of the elastomeric compound (e.g. vulcanizing agents, activators, accelerators, or the other additives optionally present) may be fed to the internal mixer (101).

Alternatively, the mixing into said internal mixer (101) may be carried out in at least two steps.

After the mixing has been carried out, the obtained first elastomeric compound (104) is fed to the ring extruder (106) through a feed hopper (105).

The mixing extruder (106) of FIG. 3, shows only one feed hopper (105). However, particularly in the case when all the components of the elastomeric compound (e.g. vulcanizing agents, activators, accelerators, or the other additives optionally present) are not fed to the internal mixer (101), more than one feed hopper (not represented in FIG. 3), may be present along the ring extruder (106). Moreover, the ring extruder (106) may be provided with gravimetically controlled feeding pumps (not represented in FIG. 3) which are useful to introduce into the ring extruder (106) additional components such as, for example, plasticizing oils.

The mixing within the ring extruder (106) produces a second elastomeric compound. After the mixing have been carried out, the second elastomeric compound (108) is discharged from the mixing extruder (106), e.g. in the form of a continuous ribbon or sheet, by pumping it through a roller die (107), for example by means of a gear pump (not shown in FIG. 3), and is subsequently cooled, preferably to room temperature, by passing it through a cooling device (109). A fixed die (not shown in FIG. 3) can also be used in place of the roller die (107).

Alternatively, the second elastomeric compound (108) may be obtained in the form of a subdivided product by pumping it through an extruder die (not represented in FIG. 3), said extruder die being provided with a perforated die plate equipped with knives. The obtained product in subdivided form is subsequently cooled, preferably to room temperature, e.g. by conveying it to a cooling device (not represented in FIG. 3).

As another alternative, the second elastomeric compound (108) can be discharged through an open head (not shown in FIG. 3).

As a further alternative, the second elastomeric compound (108) may be obtained directly in the form of a semi-finished product to be used in the assembling of a green tyre. To the purpose, an extrusion die having a predefined opening shape and equipped with a knife can be used (not shown in FIG. 3). For example, structural elements obtainable in such way could be the following ones: bead filler, sidewall, tread band, liner, underliner, antiabrasive layer. A continuous strip-like element to be used for forming structural elements of green tyres by plural windings on a support (e.g. a manufacturing drum) can also be produced by such method.

Figure 4:
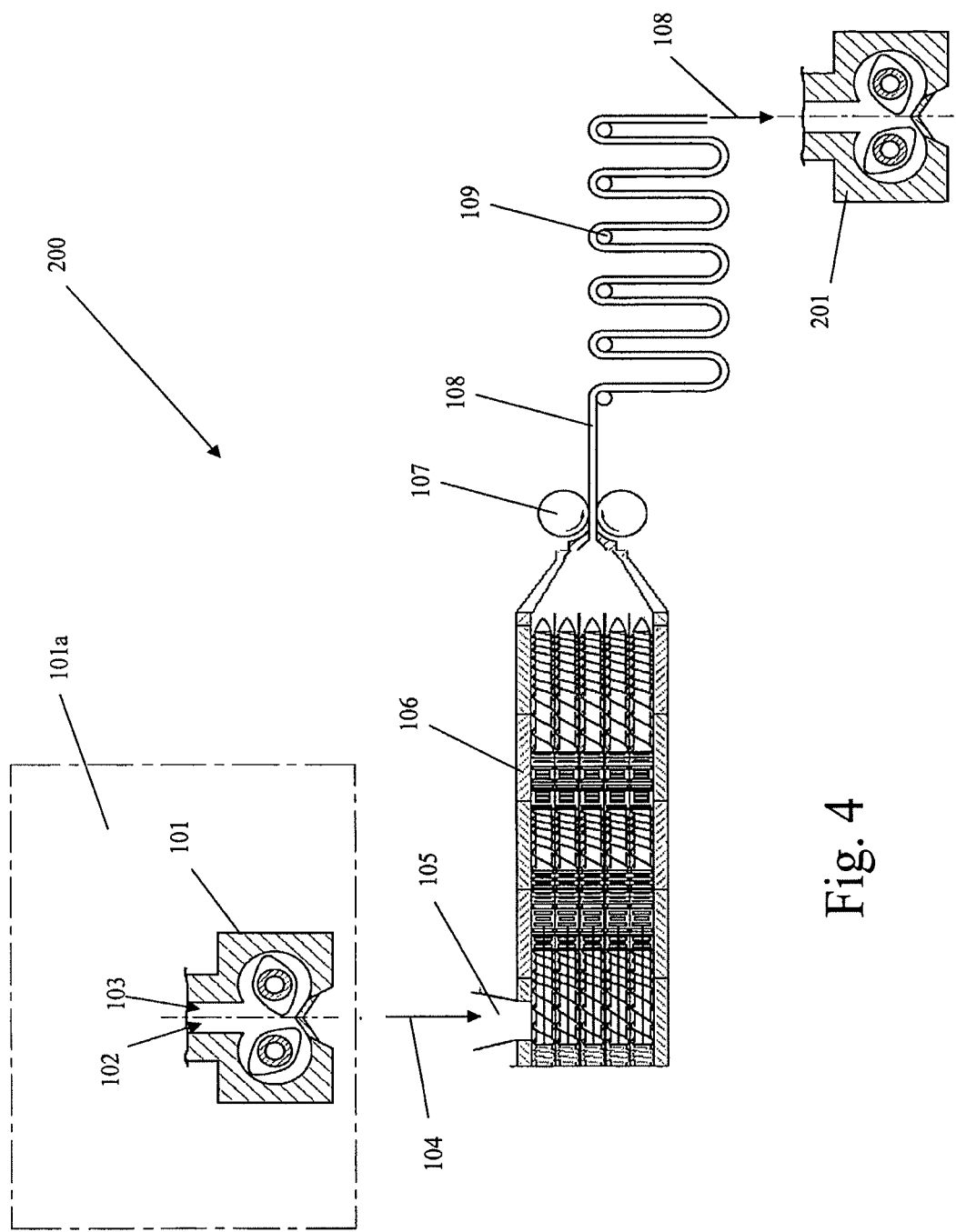

FIG. 4 shows a further embodiment of a plant (200) for producing an elastomeric compound according to the present invention: the same reference numbers have been used for the corresponding elements disclosed in FIG. 3.

According to the embodiment of FIG. 4, the second elastomeric compound (108) is fed to a further internal mixer (201) (e.g. a Banbury® mixer). The feeding to said further internal mixer (201) may be particularly useful when not all the components of the elastomeric compound are fed to the internal mixer (101). In this case, for example, the vulcanizing agents, and/or the activators, and/or the accelerators may be fed to said further internal mixer (201).

According to the particular embodiment of FIG. 4, the second elastomeric compound (108) is cooled, preferably to room temperature, by passing it through a cooling device (109) before being fed to said further internal mixer (201).

Alternatively, the second elastomeric compound (108) may be directly fed, without being cooled, to said further internal mixer (201) (not represented in FIG. 4).

Alternatively, the second elastomeric compound (108) may be obtained in the form of a subdivided product as disclosed above and subsequently fed to said further internal mixer (201) (not represented in FIG. 4).

Figure 5:
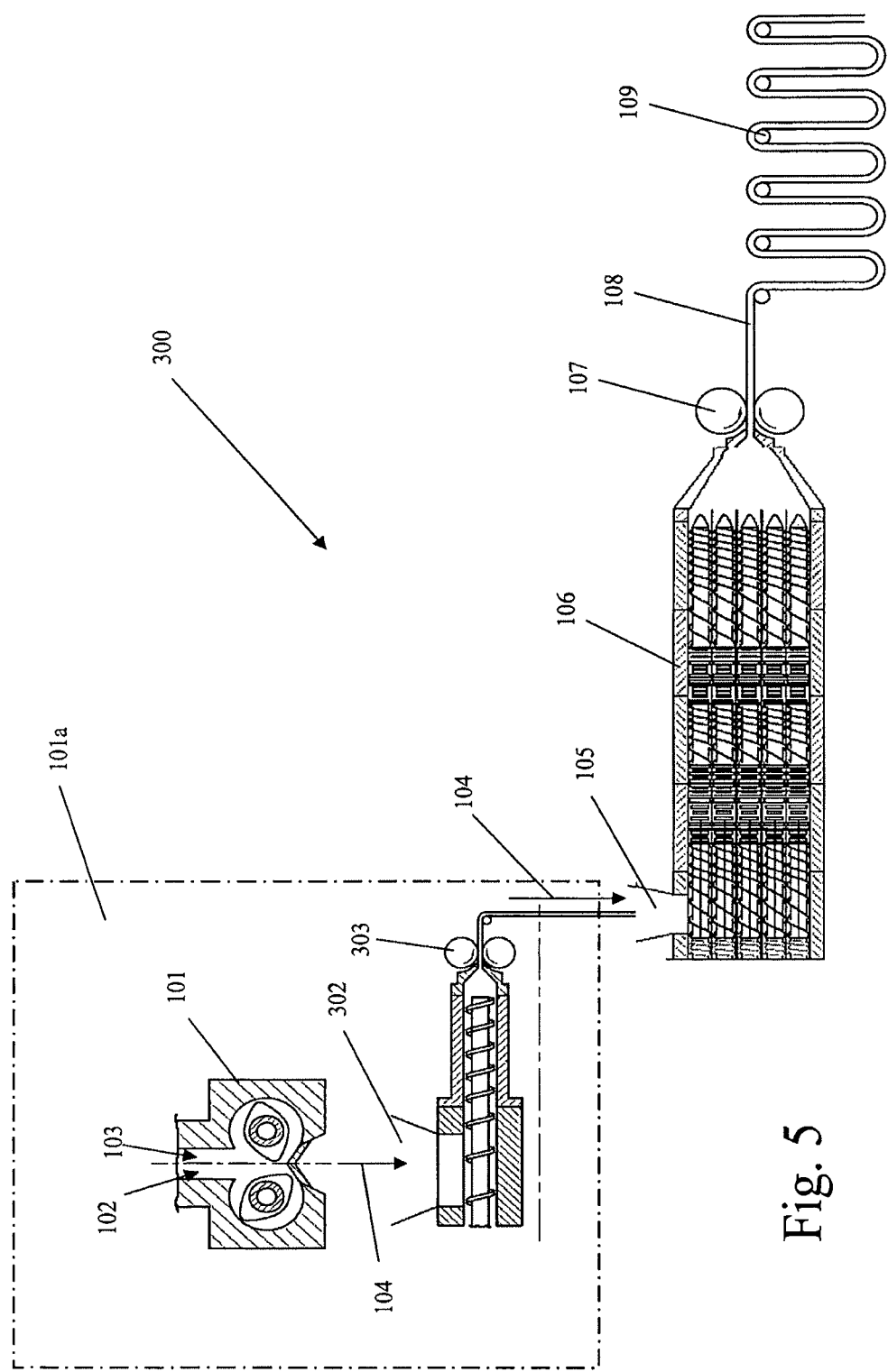

FIG. 5 shows a further embodiment of the plant (300) for producing an elastomeric compound according to the present invention: the same reference numbers have been used for the same elements as those disclosed in FIG. 3.

In the particular embodiment of FIG. 5, a mixing apparatus (101a) comprising an internal mixer (101) and a conveying extruder (301) is represented.

According to said embodiment, the first elastomeric compound (104) is fed to a conveying extruder (301) (e.g. a single helical screw extruder) through a feed hopper (302).

The feeding to said one conveying extruder (301) may allow to control the feeding rate of said first elastomeric compound (104) to the ring extruder (106).

According to the particular embodiment of FIG. 5, the first elastomeric compound (104) is directly fed to the conveying extruder (301).

Moreover, according to the particular embodiment of FIG. 5, the first elastomeric compound (104) is directly fed from said conveying extruder (301) to the ring extruder (106), through a feed hopper (105) e.g. in the form of a continuous ribbon, by pumping it through a roller die (303), for example by means of a gear pump (not represented in FIG. 5).

In an embodiment not shown in FIG. 5, the first elastomeric compound (104) is firstly cooled, preferably to room temperature, at the exit from the conveying extruder (301), by passing it through a cooling device before feeding it to the ring extruder (106). Said cooling may be useful in order to increase the viscosity of said first elastomeric compound before feeding it to said ring extruder (106), thus allowing a better mixing of said first elastomeric composition into said ring extruder (106).

Alternatively, the first elastomeric compound (104), at the exit from the conveying extruder (301), after having been cooled by passing it through the cooling device, may be reduced in the form of a subdivided product by means of a cutting device (e.g. a mill provided with rotating blades) before being fed to the ring extruder (106). Preferably, in this case, the feeding to the ring extruder (106) may be controlled by means of feeders (e.g. volumetric or loss-in-weight feeders) (not shown in FIG. 5).

Alternatively, instead of said roller die (303), said conveying extruder (301) may be equipped with:
- an extruder die provided with a perforated die plate equipped with knives in order to obtain said first elastomeric compound in the form of a subdivided product before feeding it to said mixing extruder (106) (not shown in FIG. 5); or
- an open head in order to allow said first elastomeric compound to directly flow into said ring extruder (106) (not shown in FIG. 5).

Alternatively, said conveying extruder (301) may be replaced with an open mill mixer (not shown in FIG. 5).

Alternatively, an open mill mixer may be placed between said internal mixer (101) and said conveying extruder (301) (not shown in FIG. 5).

As a further alternative not shown in FIG. 5, a further internal mixer (e.g. a Banbury® mixer) can be used downstream of the ring extruder (501), collecting the second elastomeric compound exiting from the ring extruder (106), in a similar manner to that shown in FIG. 4.

Figure 6:
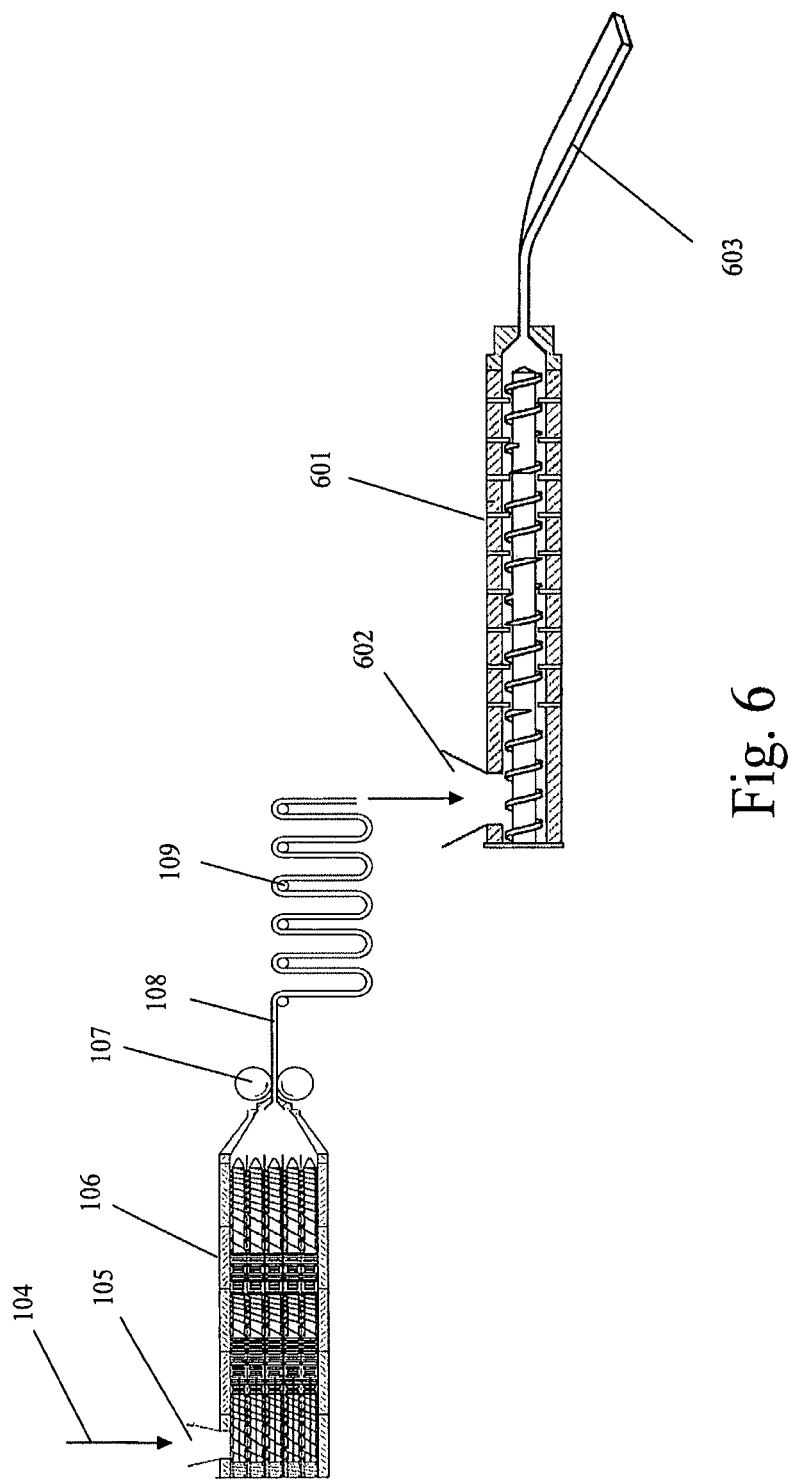

FIG. 6 shows a portion of a further embodiment of the plant (600) for producing an elastomeric compound according to the present invention: the same reference numbers have the same meanings as disclosed in the previous FIGS. 3-5.

According to the particular embodiment of FIG. 6, the second elastomeric compound (108) is fed to an extruder (601) (e.g. a cold feed single screw extruder) for manufacturing a semi-finished product, through a feed hopper (602), after cooling through a cooling device (109). In an embodiment not shown in FIG. 6, the second elastomeric compound is directly fed to the feed hopper (602) of a hot feed single screw extruder, without cooling.

The second elastomeric compound is discharged from the extruder (601) in the form of a sheet or in the form of a semi-finished product useful in tire manufacturing (such as those mentioned above) (603), by pumping it through an extrusion die (not shown in FIG. 6).

Alternatively, the second elastomeric compound (108) is discharged from the extruder (601) in the form of a sheet or in the form of a semi-finished product useful in tire manufacturing (603), by pumping it through a roller die (not represented in FIG. 6).

Usually, the obtained sheet or semi-finished product (603) is subsequently subjected to a cooling treatment, usually by means of water and/or forced air. The sheet or semi-finished product (603) thus treated is then usually arranged on benches or on bobbins waiting for further processing.

Alternatively, a continuous elongated strip-like element (not shown in FIG. 6) may be obtained from the extruder (601) which may be directly used, without being stored, in tire manufacturing, operating as disclosed above.

EXAMPLES 1-2

Preparation of the Elastomeric Compounds

The recipe of an elastomeric compound exemplarily prepared by the Applicant is given in Table 1 (the amounts of the various components are given in phr).

TABLE 1

| COMPOUND | Phr |
| --- | --- |
| NR | 70 |
| BR | 30 |
| N326 | 55 |
| Zinc oxide | 5.0 |
| Stearic acid | 2.0 |
| Antioxidant | 2.0 |
| Resorcinol | 1.0 |
| HMMM | 2.0 |
| Sulfur | 5.5 |
| PVI | 0.1 |
| DCBS | 1.0 |

NR: natural rubber (STR20—Taiteck Rubber);
BR: polybutadiene (Europrene Neocis ® BR40—Polimeri Europa);
N326: carbon black;
Antioxidant: phenyl-p-phenylenediamine (6-PPD—Akzo Nobel);
HMMM: hexamethoxymethylmelamine;
PVI (retardant): N-cyclohexylthiophthalimide (Santogard ® PVI—Flexys);
DCBS (accelerator): benzothiazyl-2-dicyclohexylsulphenamide (Vulkacit ® DZ/EGC—Lanxess).

Two elastomeric compounds having the above recipe were prepared as follows and tested on laboratory scale machines.

Example 1

Comparative

The elastomeric compound was prepared by using a two-step conventional mixing in a Banbury® mixer.

1$^{st}$ Step

All the components listed on Table 1, except sulfur, retardant (PVI), hexamethoxymethylmelamine (HMMM) and accelerator (DCBS), were mixed together in a Banbury® mixer (model F270), operating at the following working conditions:

feeding: 225 kg;
temperature: 30° C.;
mixing time: 200 seconds;
fill factor: 73%;
rotor speed: 40 rpm;
discharge temperature: 155° C.

2$^{nd}$ Step

The elastomeric compound obtained in 1$^{st}$ step was cooled to room temperature (23° C.) and subsequently fed to the same Banbury® mixer above disclosed and a further mixing was carried out operating at the following working conditions:

feeding: 200 kg;
temperature: 30° C.;
mixing time: 130 seconds;
fill factor: 65%;
rotor speed: 40 rpm;
discharge temperature: 105° C.

The obtained elastomeric compound was subsequently cooled to room temperature (23° C.)

Example 2

Invention

The elastomeric compound was produced by using a plant according to FIG. 5.

To this aim, the elastomeric compound obtained according to Example 1 and discharged from the Banbury® mixer was directly fed (without cooling) to a single screw extruder, operating at the following working conditions:

feeding rate: 5500 kg/h;
screw speed: 25 rpm;
temperature profile: 25° C.;
elastomeric compound temperature measured at extruder discharge: 105° C.

The elastomeric compound discharged from the conveying extruder was cooled to room temperature (23° C.) and subsequently fed to a ring extruder Extricom RE® 3 XP having a nominal screw diameter of 30 mm, operating at the following working conditions:

feeding rate: 165 kg/h;
screw speed: 105 rpm;
torque: 90%;
real temperature profile: 32-35-54-24-42-31-21° C.;
elastomeric compound temperature measured at extruder discharge: 120° C.
melt pressure at die: 24 bar The elastomeric compound discharged from the ring extruder was subsequently cooled to room temperature (23° C.).

For both examples 1 and 2, the obtained elastomeric compounds were tested to evaluate the following properties: Mooney viscosity (ML 1+4), mechanical properties (both static and dynamic), as well as filler dispersion: the obtained results are given in following Table 2.

Mooney Viscosity

The Mooney viscosity ML(1+4) at 100° C. of the non-crosslinked compounds was measured according to Standard ISO 289-1:1994.

Mechanical Properties

The modulus (100% Modulus), the stress at break, as well as the elongation at break, were measured according to Standard ISO 37:2005 on samples of the abovementioned elastomeric compounds vulcanized at 170° C., for 10 min.

The hardness in IRHD degrees (at 23° C.) according to Standard ISO 48:1994 was measured on samples of the abovementioned elastomeric compounds vulcanized at 170° C., for 10 min.

Dynamic mechanical properties were measured using an Instron dynamic device in the traction-compression mode according to the following methods. A test piece of crosslinked elastomeric compounds (vulcanized at 170° C., for 10 min) having a cylindrical form (length=25 mm; diameter=12 mm), compression-preloaded up to a 7.5% longitudinal deformation with respect to the initial length, and kept at the prefixed temperature (23° C. and 70° C.) for the whole duration of the test, was submitted to a dynamic sinusoidal strain having an amplitude of ±3.5% with respect to the length under pre-load, with a 10 Hz frequency. The dynamic mechanical properties are expressed in terms of dynamic elastic modulus (E') and Tan delta (loss factor) values. The Tan delta value is calculated as a ratio between viscous modulus (E") and elastic modulus (E').

Filler Dispersion

The filler dispersion was measured according to Standard ISO 11345:2006.

To this aim a test piece of crosslinked elastomeric compounds (vulcanized at 170° C., for 10 min) having the following dimension: 4 mm×4 mm, was used to evaluate both the filler dispersion (X value) and the filler distribution (Y value) by using a DisperGrader Model 1000NT with 100× magnification, (TECH PRO Corp.). This model has several scales available for comparison. The scale that was selected for these test was the RCB scale. This scale is typically used for measurement of elastomeric compounds filled with reinforcing carbon black.

Ten reference pictures are used for determining the filler dispersion (X value). An algorithm has been derived using these reference pictures and is then applied to an unknown sample. The DisperGrader then analyzes an unknown sample and automatically assigns a dispersion value (X value) to the unknown sample. Higher dispersion values (X values) represent better dispersion.

The Y value is not based on visual comparison against photographic standards, but based on the actual size and number of large agglomerates. A high rating value means that there are no agglomerates higher than 23 μm in average diameter are present in the tested areas.

TABLE 2

| EXAMPLE | Example 1 (*) | Example 2 |
|---|---|---|
| Mooney Viscosity (ML 1 + 4) | 59.6 | 57.5 |
| STATIC MECHANICAL PROPERTIES | | |
| 100% Modulus (CA1) (MPa) | 4.24 | 4.05 |
| Stress at break (MPa) | 14.14 | 16.75 |
| Elongation at break (%) | 290 | 333 |
| IRHD hardness (23° C.) | 82 | 84 |
| DYNAMIC MECHANICAL PROPERTIES | | |
| E' (23° C.) | 13.63 | 13.73 |
| E' (70° C.) | 9.51 | 9.45 |
| Tan delta (23° C.) | 0.196 | 0.202 |
| Tan delta (70° C.) | 0.142 | 0.144 |
| CARBON BLACK DISPERSION | | |
| X value | <0.5 | 3.4 |
| Y value | 3.7 | 8.3 |

(*): comparative.

The data reported in the above Table 2, shows that the crosslinked elastomeric compounds obtained according to the present invention (Example 2) has improved viscosity, stress at break and elongation at break. The remaining static and dynamic mechanical properties are not substantially affected by the further mixing performed by the ring extruder, with respect to the elastomeric compound obtained according to the prior art (Example 1).

Moreover, the data reported in the above Table 2, show that crosslinked elastomeric compound obtained according to the present invention (Example 2) has a significant improved carbon black dispersion with respect to the crosslinked elastomeric composition obtained according to the prior art (Example 1).

The invention claimed is:

1. A plant for manufacturing a tyre, comprising:
   a compounding plant capable of being adapted to produce at least one crosslinkable elastomeric compound;
   at least one manufacturing machine capable of being adapted for preparing a green tyre using a plurality of structural elements;
   at least one device capable of being adapted for preparing at least one structural element of said plurality of structural elements, wherein said at least one structural element comprises said at least one crosslinkable elastomeric compound; and
   at least one vulcanization press capable of being adapted to moulding and crosslinking said green tyre to obtain a finished tyre,
   wherein the compounding plant comprises:
   a mixing apparatus comprising at least one batch mixing device, said mixing apparatus capable of being adapted to produce a first elastomeric compound; and
   at least one multi-shaft continuous mixing device, said multi-shaft continuous mixing device being a ring extruder and comprising an inner core, an outer housing defining with said inner core an annular chamber, and at least six rotating screws, wherein said ring extruder comprises at least one gas outlet opening provided in said outer housing, said multi-shaft continuous mixing device capable of being adapted to receive said first elastomeric compound and to produce a second elastomeric compound; and
   a vacuum device configured to apply a vacuum to said at least one gas outlet opening during mixing of said first elastomeric compound in said ring extruder.

2. The plant according to claim 1, wherein said at least one batch mixing device is selected from internal mixers and open mixers.

3. The plant according to claim 1, wherein said at least one multi-shaft continuous mixing device comprises at least six co-rotating screws.

4. The plant according to claim 1, wherein said at least one multi-shaft continuous mixing device comprises at least twelve rotating screws.

5. The plant according to claim 1, wherein said rotating screws have a diameter of at least 30 mm.

6. The plant according to claim 5, wherein said rotating screws have a diameter of at least 60 mm.

7. The plant according to claim 1, wherein said at least six screws are at least partially intermeshed.

8. The plant according to claim 1, wherein said mixing apparatus includes at least one open mixer.

9. The plant according to claim 1, wherein said mixing apparatus comprises at least one internal mixer and at least one open mixer, said open mixer capable of being placed downstream of said at least one internal mixer.

10. The plant according to claim 1, further comprising at least one conveying extruder between said mixing apparatus and said at least one multi-shaft continuous mixing device.

11. The plant according to claim 10, wherein said at least one conveying extruder comprises:
   a housing comprising at least one feed opening and a discharge opening; and
   at least one conveying element rotatably mounted in said housing.

12. The plant according to claim 1, comprising a further batch mixing device downstream of said multi-shaft continuous mixing apparatus, the further batch mixing device capable of being adapted to perform a further mixing of said second elastomeric compound.

13. The plant according to claim 1, wherein an output of said at least one multi-shaft continuous mixing device is equipped with a roller die or with a fixed die.

14. The plant according to claim 1, wherein an output of said at least one multi-shaft continuous mixing device is an open head.

15. The plant according to claim 1, wherein said compounding plant comprises at least two multi-shaft continuous mixing devices.

16. The plant according to claim 1, wherein said mixing device is configured to operate at a rotor speed of about 20 rpm to about 60 rpm.

17. The plant according to claim 1, wherein said mixing device is configured to operate at a rotor speed of about 30 rpm to about 50 rpm.

18. The plant according to claim 1, wherein said mixing device is configured to operate using a fill factor of the mixing chamber that is not higher than about 80%.

19. The plant according to claim 1, wherein said mixing device is configured to operate using a fill factor of the mixing chamber from about 55% to about 70%.

20. The plant according to claim 1, wherein said mixing device is configured to operate at a screw rotation speed of about 10 rpm to about 600 rpm.

21. The plant according to claim 1, wherein said mixing device is configured to operate at a screw rotation speed of about 40 rpm to about 400 rpm.

22. The plant according to claim 1, wherein said mixing device is configured to produce an average throughput of at least 500 kg/h.

* * * * *